United States Patent Office 3,405,766
Patented Oct. 15, 1968

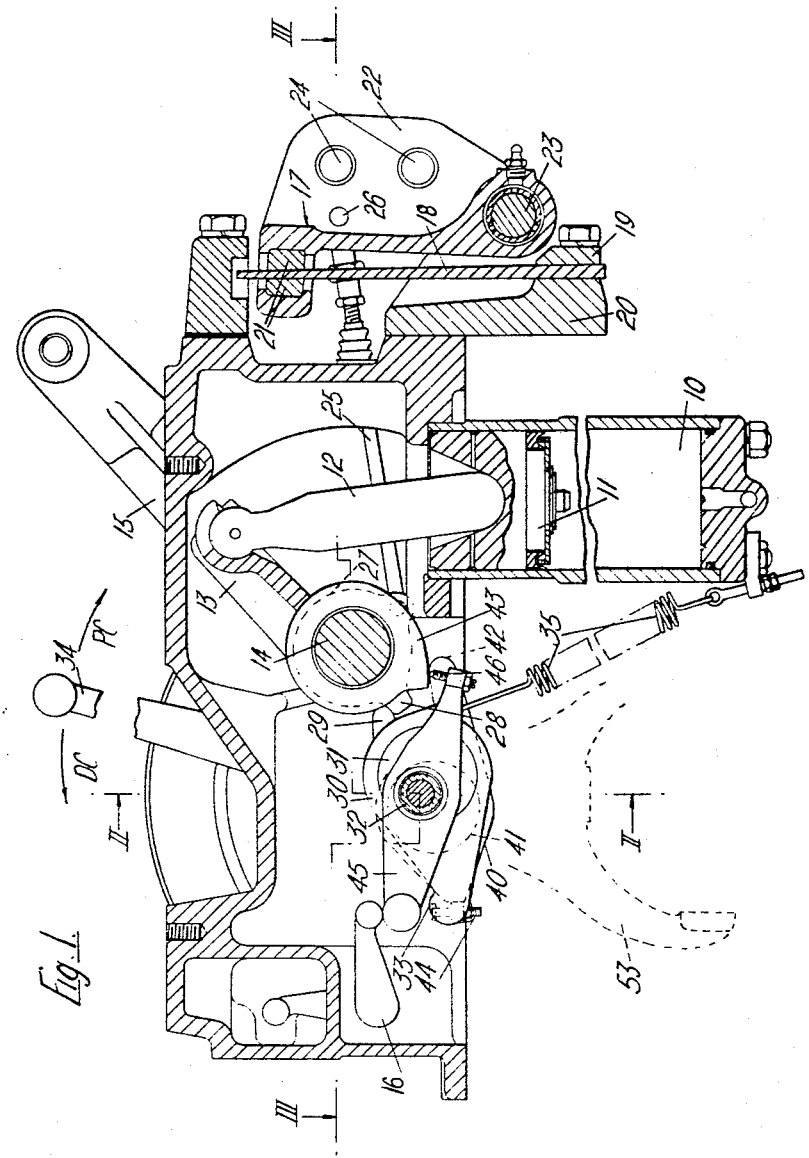

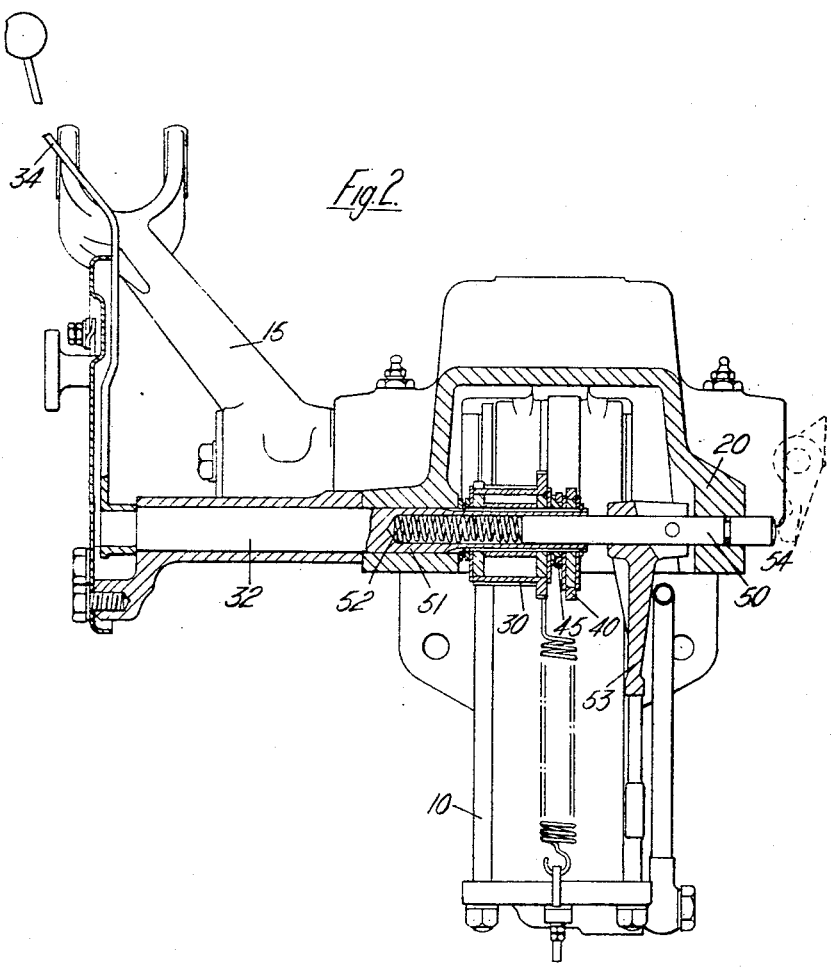

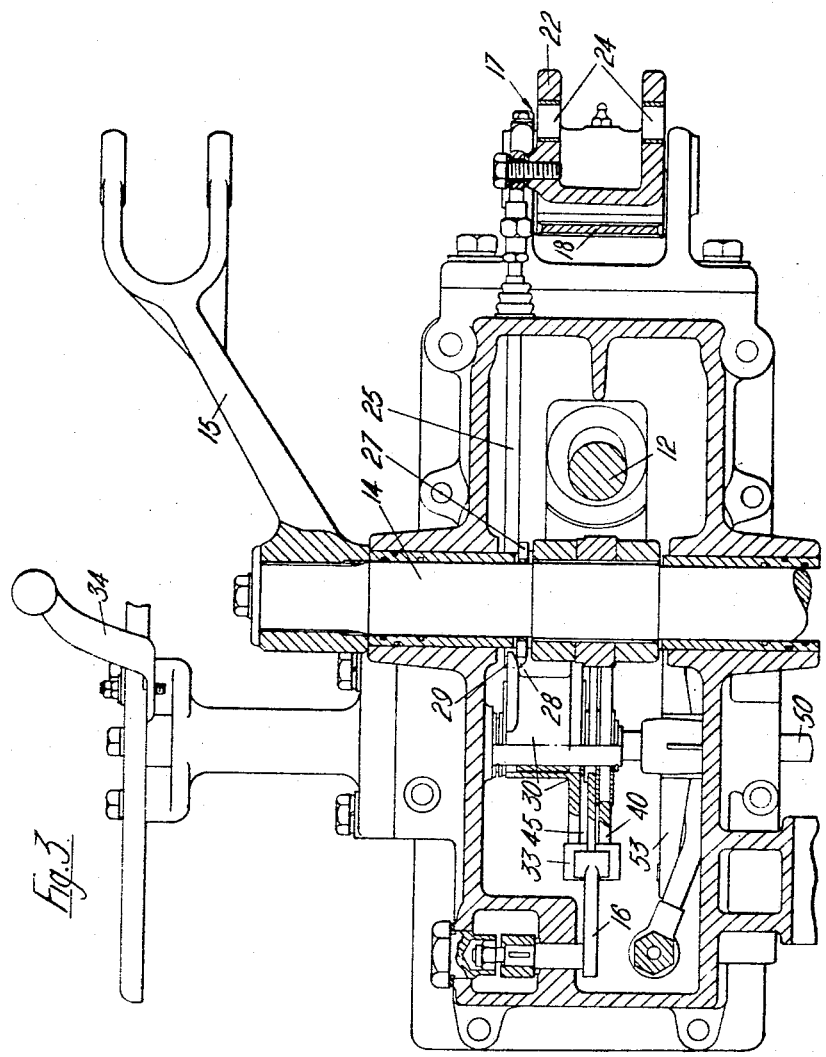

3,405,766
TRACTOR HYDRAULIC CONTROL SYSTEM
Eugenio Todeschini, Como, Italy, assignor to Landini S.p.a., Reggio Emilia, Italy, a company of Italy
Filed Feb. 11, 1965, Ser. No. 431,880
Claims priority, application Great Britain, Feb. 11, 1964, 5,573/64
7 Claims. (Cl. 172—10)

ABSTRACT OF THE DISCLOSURE

A hydraulic power lift control mechanism including a valve having raise, neutral and lowering positions and being operable automatically and selectively in response to changes in position of the tractor draft links, to changes in force upon the draft links or to changes in pressure in the lift cylinder caused by changes in draft force. Further, the selections between the types and/or degree control may be made manually.

---

This invention relates to tractors and more particularly to hydraulic power lift control mechanisms of the type including a hitch linkage by means of which an agricultural or other implement may be attached to and supported by the tractor, and a hydraulic system including at least one cylinder-and-piston device, a mechanical connection, including a cross-shaft, between the cylinder-and-piston device and the hitch linkage, a pump which delivers hydraulic pressure fluid to said device and control valve means which is moveable to cause the hitch linkage to be raised by said device, to be held stationary in a neutral position by said device and to be lowered, the control valve means being subject to combined manual and automatic control.

A tractor hydraulic power lift mechanism of this type is referred to hereinafter as "a tractor hydraulic power lift mechanism of the type aforesaid."

The term "manual" is used herein to indicate either hand or foot operation.

The automatic control means may for example, be what is commonly known as automatic draft control means, automatic position control means, or pressure control means or any combination of these controls where manual control and automatic draft control are provided, the control maintains a manually predetermined draft force, between the implement and the tractor.

Where manual control and automatic position control are provided, the control maintains the hitch linkage and the implement supported thereby positioned at a predetermined level which remains constant relative to the tractor.

The automatic control means may also be automatic pressure control means which, used in conjunction with manual control means, acts to maintain a manually predetermined pressure in the piston-and-cylinder device.

The invention utilizes a tractor hydraulic power lift mechanism of the type aforesaid having control valve means adapted to be operated conjointly by manual control means and automatic control means, the manual and automatic control means including a shaft rotatable by the manual control means, a first actuating member for the control valve means mounted on the shaft and rotatable about an axis eccentric to the shaft. This rotation is under the influence of the manual and automatic control means, and a second actuating member for said control valve means rotatably mounted on the shaft and adapted to be rotated by a member sensing the transport position of the hitch linkage to over-ride the first member and move the control valve means from the raising to the neutral position.

Preferably, a third actuating member for said control valve means is also provided on the shaft and is rotatable about a second axis eccentric to the shaft under the influence of automatic position control means, the first and third actuating members being spaced so that in a first range of movement of said manual control means the control valve means is under the control of the first actuating member and in a second range of movement of the manual control means, the control valve means is under the control of the third actuating member.

The invention is also a tractor including a pair of laterally spaced driving wheels, a differential gear interconnecting said wheels and a lock for the differential gear, the lock including a first shaft disposed transversely of the tractor and having a tubular end portion, a second shaft coaxial with said first shaft, one end of said second shaft being supported in and guided by said tubular end portion of said first shaft, one of said shafts carrying a locking member connected to an element of said differential gear, and first manual control means adapted to slide one of said shafts axially relative to the other to operate said lock.

An embodiment of the invention will now be described, by way of example only, with reference to the accompanying drawings, in which:

FIG. 1 is a sectional elevation of part of the gear housing of a tractor incorporating a tractor hydraulic power lift mechanism;

FIG. 2 is a section on the line II—II of FIG. 1; and

FIG. 3 is a section taken approximately along the line III—III of FG. 1.

Referring to the drawings, the hydraulic system includes the usual cylinder 10 and ram 11, the ram being connected through a rod 12 to an arm 13 mounted on a cross shaft 14. The usual lift arms 15 are mounted on the cross shaft 14 for connection to the tractor draft links (not shown).

Supply and exhaust of hydraulic fluid to and from the cylinder 10 is effected by a bell crank lever 16 which is spring urged in a clockwise direction and which operates control valve means, which may be a single control valve movable between raise, neutral and lower positions by alternatively connecting the cylinder 10 to a source of fluid under pressure, to exhaust or trapping fluid therein. The details of the control valve hydraulic circuit form no part of the present invention. A control mechanism is provided for allowing automatic draft control of an implement mounted on the hitch linkage. The control mechanism includes a sensing device in the form of a balance spring assembly 17 including a leaf spring 18 secured at 19 to the tractor housing 20 so as to project upwards therefrom. Near to its upper end the leaf spring is connected by means of resilient rubber blocks 21 to a lever 22 pivotally connected at 23 to the tractor housing 20. The lever 22 includes two apertures 24 to any one of which the tractor top link (not shown) may be pivotally connected.

A rod 25 is pivoted at 26 to the lever 22 and is connected to an annular member 27 co-axial with and rotatable about the cross shaft 14. The member 27 has a lug 28 which engages a similar lug 29 on a first actuating member or lever 30 rotatably mounted on a disc 31 secured to a shaft 32 for rotation about an axis eccentric to the axis of the shaft 32. A cam 33 is provided at one end of the lever 30. The shaft 32 is rotatable by manual control means in the form of a handle lever 34, and the lever 30 is urged clockwise by a spring 35. This spring urges the lugs 28 and 29 into engagement and the lug 28 effectively acts as a fulcrum about which the lever 30 may pivot. Thus, movement of the lever 34 to the left in FIG. 1 causes upward pivotal movement of the cam 33 on the lever 30 about the lug 28 and, conversely, movement of the lever 34 to the right causes downward pivotal movement of the cam 33.

In the drawing the mechanism is shown in the position it occupies when the draft links are in their fully raised or transport position. In operation, to achieve automatic draft control, the manual control lever 34 is moved to the left in FIG. 1 into the draft control range shown in the drawing as DC.

This movement tends to rotate the lever 30 counter-clockwise, but such rotation is opposed by the spring 35 and this results in upward pivotal movement of the cam 33 on the lever 30 about the lug 28, so that the cam rises into engagement with the bell-crank lever 16. The latter thus rotates counter-clockwise and operates the control valve to exhaust fluid from the cylinder 10 and lower the draft links and the implement.

As the implement engages the ground and moves forward the tension in the top link decreases and thus the lever 22 pivots counter-clockwise about the pivot 23 and the rod 25 moves to the left in FIG. 1. This results in clockwise rotation of the annular member 27 about the cross-shaft 14 and the lug 28 forces the lug 29 upwards against the action of the spring 35 to rotate the lever 30 counter-clockwise. The bell-crank lever 16 is thus permitted to rotate clockwise to return the control valve to neutral and prevent further exhaust of fluid from the cylinder 10 thus maintaining the implement at the height which corresponds to the value of draft force selected by movement of the lever 34.

Changes in draft force are thereafter transmitted through the lever 22 and rod 25 to the annular member 27, movement of which about the shaft 14 moves the lever 30 through the cooperating lugs 28 and 29. This movement of the lever 30 is transmitted to the control valve 2 through the bell-crank lever 16 and hydraulic fluid is then supplied to or exhausted from the cylinder 10 to raise or lower the draft links and restore the draft force to the selected value.

For example, if the draft force increases the lever 22 and rod 25 move to the left in FIG. 1, the annular member 27 rotates clockwise, the lever 30 rotates counter-clockwise and the bell-crank lever 16 rotates clockwise, thus actuating the aforesaid control valve 2 to supply hydraulic fluid to the cylinder 10 to raise the draft links and reduce the draft force till it reaches its original value.

A third actuating member or lever 40 is rotatably mounted on a further disc 41 secured to the shaft 32 for rotation about an axis eccentric to the axis of the shaft 32. The axis of rotation of the lever 40 is offset to the opposite side of the axis of the shaft 32 from the axis of rotation of the lever 30. A lug on one end of the lever 40 contacts a cam 43 secured to the cross-shaft 14. A stud 44 is provided on the other end of the lever 40.

This arrangement allows position control of an implement mounted on the draft links. As aforesaid the mechanism is shown in the drawing in the fully raised position. To lower the implement from this position using position control, the manual control lever 34 is moved to the right in FIG. 1 into the position control range shown in the drawing as PC. This tends to rotate the levers 30 and 40 clockwise. Rotation of the lever 30 in a clockwise direction is prevented by abutment of the lugs 28 and 29 and this results in downward movement of the cam 33 away from the bell-crank lever 16. However, clockwise movement of the lever 40 is not opposed and thus the stud 44 is raised into engagement with the bell-crank lever 16. Abutment of the lug with the cam 43 prevents counter-clockwise rotation of the lever 40 and hence the stud 44 is forced upwards against the crank lever 16 rotating it in a counter-clockwise direction and exhausting fluid from the cylinder 10 to lower the draft links.

As the draft links are lowered, the shaft 14 rotates clockwise, and the bell-crank lever 16 which is urged by the control valve spring, now shown, pushes the stud 44 downwards, this being permitted since the lug on the lever 40 follows the cam 43. The bell-crank lever thus rotates clockwise and permits the control valve to return to neutral so that lowering of the draft links ceases.

Although under normal conditions, the control valve 2 will be returned to neutral after raising or lowering by the position control arrangement as just described, to ensure that the valve is returned to neutral, a second actuating member or lever 45 is rotatably mounted on the shaft 32. One end of this carries a stud 46 which engages with the position control cam 43 and since the axis of rotation of this lever is not moved on turning of the manual control lever 34, it will automatically move the control valve to neutral when transport position is reached. The action of the lever 45 is more positive due to its fixed axis than the action of the lever 40, and is not influenced by the manual lever 34.

In the position shown, with the draft links in their fully raised position the lever 45 prevents clockwise movement of the bell-crank lever 16 so that it is impossible to raise the draft links further. When lowering the draft links the manual control lever 34 is moved either to the left (into the draft control range), or to the right (into the position control range) and one or other of the levers 30 and 40 moves upwards past the lever 45 into engagement with the bell-crank lever 16 so as to rotate it counter-clockwise and lower the draft links.

The power lift mechanism could also be used in conjunction with a tractor fitted with an automatic pressure control system by means of which changes in pressure in the cylinder 10, caused by variations in the downward force acting on the tractor draft links, are transmitted to a sensing device not shown connected to the rod 25. An example of such a sensing device is shown in United States Patent 2,627,815, Constant Pressure Hydraulic Power Transmitting System.

This device moves the rod 25 to left or right in FIG. 1 to operate the bell-crank lever 16 and hence supply or exhaust fluid to or from the cylinder 10 until the original pressure is restored, at which point the aforesaid control valve will be in its natural position. The desired pressure in the cylinder 10 would be selected by movement of a lever similar to the lever 34.

The system also includes a differential lock, best illustrated in FIG. 2. The differential lock includes a shaft 50 which is coaxial with the shaft 32. The shaft 50 is supported at its outer end on the tractor housing 20 and its inner end slides in and is supported by a tubular end portion 51 of the shaft 32. A spring 52 is located in the tubular end portion 51 and bears against the shaft 50 tending to push it to the right in FIG. 2. A differential lock actuating member 53 is provided on the shaft 50 and is shown in the disengaged position in FIG. 2. When it is required to engage the differential lock, the shaft 50 and hence the actuating member 53 is moved to the left through a suitable actuating linkage indicated generally at 54. This linkage can be operated by any suitable method such as an actuating pedal. The member 53 may be connected to a toothed element (not shown) which slides into engagement with a component of the differential gear on the shaft 50.

It will be understood that modifications, changes and other applications made by those skilled in the art and are deemed to be within the scope of the invention which is limited only by the following claims.

I claim:

1. A hydraulic power lift mechanism for a tractor having hitch linkage having control valve means movable between a raise position, a neutral position and a lowering position for controlling the raising and lowering of the hitch linkage between a lowered operative position and a raised transport position and adapted to be operated by combined manual and automatic control means, said manual and automatic control means including a shaft rotatable by the manual control means, a first actuating member for said control valve means for moving the same between its positions, said first member mounted on said shaft for rotation about an axis eccentric to the axis of said shaft under the influence of said manual and automatic control means, and a second actuating member for said control valve means mounted on said shaft for rotation about the axis of said shaft and arranged to be rotated in response to the raising of the linkage to transport position to move said control valve means from its raising position to its neutral position.

2. A tractor hydraulic power lift mechanism according to claim 1 including a third actuating member mounted on said shaft and rotatable about a second axis eccentric to said shaft axis under the influence of automatic control means responsive to the position of the hitch linkage, said first and third actuating members being arranged such that in a first range of movement of said manual control means said control valve means is under control of said first actuating member, and in a second range of movement of said manual control means said control valve means is under the control of said third actuating member.

3. A tractor hydraulic power lift mechanism according to claim 1 in which said automatic control means includes automatic draft control means including a sensing device movable in response to changes in the draft forces on the linkage and having an operative connection with said first actuating member to rotate the same on said shaft.

4. A tractor hydraulic power lift mechanism according to claim 1, in which said automatic control means includes automatic pressure control means including a sensing device movable in response to changes in pressure in the hydraulic lift mechanism and having an operative connection with said first actuating member to rotate the same on said shaft.

5. A tractor hydraulic power lift mechanism according to claim 3 in which the hydraulic lift mechanism includes a rotatable cross shaft, said operative connection including an annular member concentric with and rotatable about said cross-shaft, a first lug on said annular member, a second lug on said first actuating member, and spring means urging said second lug into abutment with said first lug.

6. A tractor hydraulic power lift mechanism according to claim 5 in which said second actuating member sensing the transport position of the hitch linkage is operated by a cam mounted on and rotatable with said cross-shaft.

7. A tractor hydraulic power lift mechanism according to claim 6 in which said second and third actuating members are both selectively rotatable by said cam to over-ride said first member.

References Cited

UNITED STATES PATENTS 3,239,012   3/1966   Bunting et al. _____ 172—9

ABRAHAM G. STONE, *Primary Examiner.*

J. R. OAKS, *Assistant Examiner.*